(12) United States Patent  
Fujikawa et al.

(10) Patent No.: US 11,247,368 B2  
(45) Date of Patent: Feb. 15, 2022

(54) SILICONE MOLD

(71) Applicant: DAICEL CORPORATION, Osaka (JP)

(72) Inventors: Takeshi Fujikawa, Himeji (JP); Sadayuki Fukui, Himeji (JP)

(73) Assignee: DAICEL CORPORATION, Osaka (JP)

( * ) Notice: Subject to any disclaimer, the term of this patent is extended or adjusted under 35 U.S.C. 154(b) by 160 days.

(21) Appl. No.: 16/498,344

(22) PCT Filed: Feb. 5, 2018

(86) PCT No.: PCT/JP2018/003846  
§ 371 (c)(1),  
(2) Date: Sep. 26, 2019

(87) PCT Pub. No.: WO2018/179842  
PCT Pub. Date: Oct. 4, 2018

(65) Prior Publication Data  
US 2020/0031024 A1   Jan. 30, 2020

(30) Foreign Application Priority Data  
Mar. 27, 2017   (JP) .............................. JP2017-060304

(51) Int. Cl.  
*B29C 33/40* (2006.01)  
*B29D 11/00* (2006.01)  
(Continued)

(52) U.S. Cl.  
CPC ........ *B29C 33/40* (2013.01); *B29D 11/00134* (2013.01); *G02B 1/041* (2013.01); *G02B 3/00* (2013.01); *B29K 2063/00* (2013.01)

(58) Field of Classification Search  
CPC ... B29C 33/40; B29D 11/00134; G02B 1/041; G02B 3/00  
See application file for complete search history.

(56) References Cited

U.S. PATENT DOCUMENTS 10,118,322 B2    11/2018   Mizuta et al.  
2015/0212300 A1*  7/2015   Kubo ................ C08G 59/3281  
                                            359/754

(Continued)

FOREIGN PATENT DOCUMENTS

EP   2711 161 A1   3/2014  
EP   3088 465 A1   11/2016  
(Continued)

OTHER PUBLICATIONS

International Search Report for International Application No. PCT/JP2018/003846, dated Apr. 10, 2018, with English translation.

(Continued)

*Primary Examiner* — Mathieu D Vargot  
(74) *Attorney, Agent, or Firm* — Birch, Stewart, Kolasch & Birch, LLP

(57) ABSTRACT

Provided is a silicone mold with which a curable composition containing an epoxy resin can be molded with good precision even if used repeatedly. The silicone mold according to an embodiment of the present invention is a silicone mold for use in molding a curable composition containing an epoxy resin, the silicone mold including a cured product of a silicone resin composition, wherein the cured product has a light transmittance at a wavelength of 400 nm of 80% or higher at a thickness of 1 mm, an elongation at break in accordance with JIS K 7161 of 250% or less, and a thermal linear expansion coefficient of 350 ppm/° C. or less at 20 to 40° C.

19 Claims, 1 Drawing Sheet

(51) Int. Cl.
   *G02B 1/04*   (2006.01)
   *G02B 3/00*   (2006.01)
   *B29K 63/00*  (2006.01)

(56) References Cited

U.S. PATENT DOCUMENTS

2016/0009006 A1   1/2016   Mizuta et al.
2016/0368263 A1   12/2016  Saito et al.
2018/0215861 A1   8/2018   Fujikawa et al.

FOREIGN PATENT DOCUMENTS

JP    2010-5899 A         1/2010
JP    2010-45092 A        2/2010
JP    2017-36421 A        2/2017
WO    WO 2014/119514 A1   8/2014

OTHER PUBLICATIONS

Written Opinion of the International Searching Authority for International Applicalion No. PCT/JP2018/003846, dated Apr. 10, 2018, with English translation.
Extended European Search Report dated Oct. 15, 2020, in European Patent Application No. 18778209.9.
Jiang et al., "Pressure free nanoimprinting lithography using ladder-type HSQ material for LSPR biosensor chip," Sensors and Actuators B: Chemical (2017), vol. 242, pp. 47-55.
Communication Pursuant to Article 94(3) EPC dated Jul. 15, 2021, in European Patent Application No. 18 778 209.9.

* cited by examiner

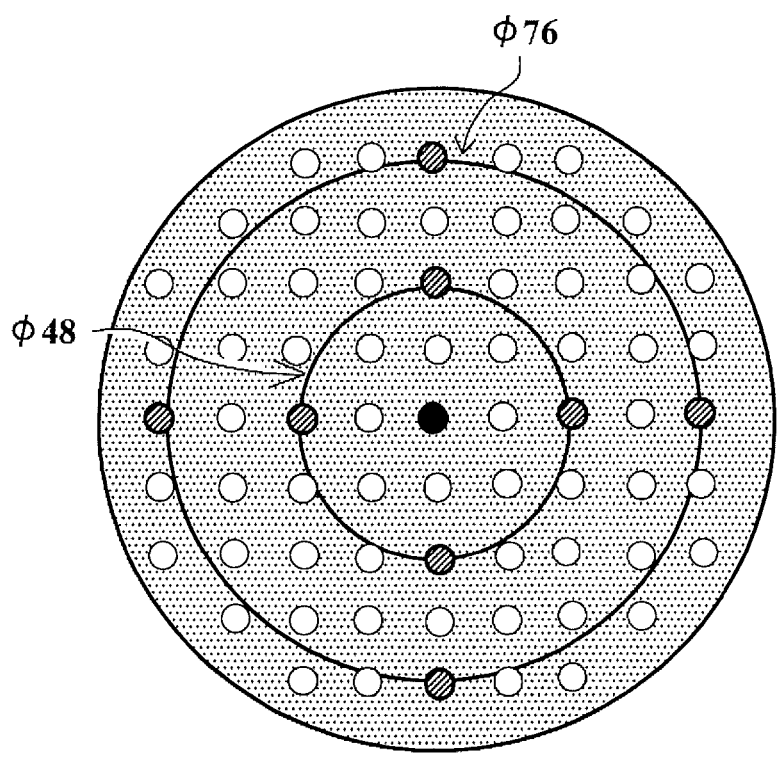

SILICONE MOLD

TECHNICAL FIELD

The present invention relates to a silicone mold for use in molding a curable composition containing an epoxy resin, a method for producing the same, and a method for producing an optical element using the silicone mold. The present application claims priority to JP 2017-060304 filed to Japan on Mar. 27, 2017, of which content is incorporated herein.

BACKGROUND ART

In recent years, there has been a demand for mobile electronic devices, such as mobile phones and smartphones, to improve product value by mounting an optical component, such as a sensor or a camera. In addition, such products have been reduced in size and thickness year by year, and smaller and thinner components are required to be used therefor. To address such a demand, injection molding has been utilized to produce components so far, but the injection molding method has reached its limit in terms of reducing size and thickness.

Thus, an imprint molding method has attracted attention as a new molding method that replaces the injection molding method (Patent Document 1). The imprint molding method, however, is likely to cause problems in releasability and molding precision due to a molding material and a material of the mold to be used. For example, a metal mold or a glass mold, when used, has problems in releasability, and problems are that precision of the molded product is low due to a part of the molded product being likely to remain in the mold without being released therefrom and that the mold can no longer be used because a part of the molded product remains therein. Patent Document 1 describes an invention for improving releasability by coating a surface of a molding material with a release agent. However, the release agent is mixed into the molding material, and this has a tendency to reduce heat resistance and transparency of a resulting molded product. On the other hand, silicone molds have excellent releasability but are prone to being affected by heat. For example, when an epoxy resin is used as a molding material, the mold easily undergoes expansion by heat generated in a curing reaction, and thus this problematically reduces the molding precision with repeated use.

CITATION LIST

Patent Document

Patent Document 1: JP 2010-45092 A

SUMMARY OF INVENTION

Technical Problem

Accordingly, an object of the present invention is to provide a silicone mold that can mold a curable composition containing an epoxy resin with good precision even if used repeatedly.

Another object of the present invention is to provide a method for producing the silicone mold.

Another object of the present invention is to provide a method for producing an optical element using the silicone mold.

Solution to Problem

As a result of diligent research to solve the above problems, the present inventors found that when a silicone mold having suitable hardness and excellent heat resistance, due to having densely a cross-linked three-dimensional network structure, and having transparency, is used in molding (in particular, imprinting molding) a curable composition containing an epoxy resin, an effect of heat due to curing of the resin can be kept to minimum and a molded product with high precision can be produced even if used repeatedly. The present invention has been completed based on these findings.

That is, the present invention provides a silicone mold for use in molding a curable composition containing an epoxy resin, the silicone mold including a cured product of a silicone resin composition, wherein the cured product has a light transmittance at a wavelength of 400 nm of 80% or higher at a thickness of 1 mm, an elongation at break in accordance with JIS K 7161 of 250% or less, and a thermal linear expansion coefficient of 350 ppm/° C. or less at from 20 to 40° C.

The present invention also provides the silicone mold, wherein the silicone resin composition is an addition reaction type silicone resin composition.

The present invention also provides the silicone mold, wherein a maximum thickness of the silicone mold is 5 mm or less.

The present invention also provides a method for producing a silicone mold including molding a silicone resin composition, and subsequently heat-curing the silicone resin to form the silicone mold.

The present invention also provides a method for producing an optical element including molding a curable composition containing an epoxy resin using the silicone mold and subsequently subjecting the curable composition to photocuring to form an optical element including a cured product of the curable composition.

The present invention also provides the method for producing an optical element, wherein the epoxy resin is a polyfunctional alicyclic epoxy compound.

The present invention also provides the method for producing an optical element, wherein the epoxy resin is a compound represented by Formula (i) below:

[Chem. 1]

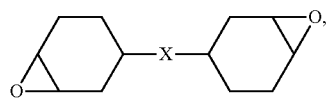

wherein X represents a single bond or a linking group.

The present invention also provides the method for producing an optical element, wherein a maximum thickness of the optical element is from 0.1 to 2.0 mm.

The present invention also provides the method for producing an optical element, wherein the optical element is a microlens, a Fresnel lens, a molded product formed of a plurality of microlenses or Fresnel lenses bonded via a joining section, a lenticular lens sheet, or a prism sheet.

Advantageous Effects of Invention

The silicone mold according to an embodiment of the present invention includes the above configuration, thus it has excellent shape stability and can reduce an effect due to heat generated by the curing reaction of the epoxy resin, i.e., the expansion caused by heat generated by the curing reaction of the epoxy resin, to a very low level. In addition, the silicone mold has moderate hardness and thus can prevent degradation due to repeated use. Thus, the silicone mold according to an embodiment of the present invention can reduce the decrease in molding precision due to repeated use to a very low level, compared to molds known in the art, and when the silicone mold according to an embodiment of the present invention is used, a high-precision optical element can be produced stably from the curable composition containing the epoxy resin.

BRIEF DESCRIPTION OF DRAWINGS

FIG. 1 is a schematic view illustrating a shape of the molded product obtained in Examples and Comparative Examples, the central point, four lens shapes located at or near the diameter 48 mm, and four lens shapes located at or near the diameter 76 mm of the molded product.

DESCRIPTION OF EMBODIMENTS

Silicone Mold

The silicone mold according to an embodiment of the present invention is a mold for use in molding a curable composition (preferably a photocurable composition) containing an epoxy resin, the silicone mold including a cured product of a silicone resin composition, wherein the cured product has a light transmittance at a wavelength of 400 nm of 80% or higher at a thickness of 1 mm, an elongation at break in accordance with JIS K 7161 of 250% or less, and a thermal linear expansion coefficient of 350 ppm/° C. or less at 20 to 40° C.

Silicone Resin Composition

The silicone resin composition in an embodiment of the present invention includes an addition reaction type silicone resin composition and a condensation reaction type silicone resin composition. In an embodiment of the present invention, an addition reaction type silicone resin composition is preferred particularly in terms of preventing curing shrinkage and preventing expansion and shrinkage due to temperature change of a resulting cured product (i.e., a silicone mold).

The addition reaction type silicone resin composition (which may be hereinafter referred to as a "resin composition") includes at least a silicone resin (A), a curing agent (B), and a hydrosilylation catalyst (C).

Silicone Resin (A)

The silicone resin (A) in an embodiment of the present invention is preferably a siloxane including two or more alkenyl groups in the molecule (i.e. a compound including a siloxane bond (Si—O—Si)). The silicone resin (A) is a component that causes a hydrosilylation reaction with the curing agent (B) described later (such as a siloxane (B) including a hydrosilyl group). One type of the silicone resin (A) alone or two or more types thereof in combination can be used.

Siloxanes including two or more alkenyl groups in the molecule include linear, branched, or cyclic polyorganosiloxanes.

The linear or branched polyorganosiloxane including two or more alkenyl groups in the molecule is represented, for example, by Formula (a) below:

[Chem. 2]

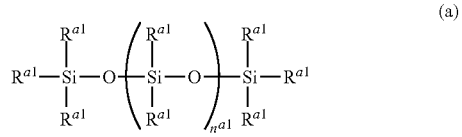

wherein $R^{a1}$ is the same or different and represents a hydrocarbon group that may include a substituent; or a $[-OSi(R^{a1})_3]$ group ($R^{a1}$ is the same as above), with the proviso that at least two of $R^{a1}$ are alkenyl and that $n^{a1}$ represents an integer of 1 or greater.

Examples of the alkenyl group in the $R^{a1}$ include a vinyl group, an allyl group, a butenyl group, a pentenyl group, and a hexenyl group. Among them, a vinyl group is preferred.

Examples of the hydrocarbon group other than the alkenyl group in the $R^{a1}$ include monovalent substituted or unsubstituted hydrocarbon groups, such as alkyl groups (for example, such as a methyl group, an ethyl group, a propyl group, a butyl group, a pentyl group, and a hexyl group); cycloalkyl groups (for example, such as a cyclopropyl group, a cyclobutyl group, a cyclopentyl group, a cyclohexyl group, and a cyclododecyl group); aryl groups (for example, such as a phenyl group, a tolyl group, a xylyl group, and a naphthyl group); cycloalkyl-alkyl groups (for example, such as a cyclohexylmethyl group and a methylcyclohexyl group), aralkyl groups (for example, such as a benzyl group and a phenethyl group), and halogenated hydrocarbon groups in which one or more of the hydrogen atoms bonded to the hydrocarbon group are replaced with halogen atoms (for example, such as halogenated alkyl groups like a chloromethyl group, a 3-chloropropyl group, and a 3,3,3-trifluoropropyl group). The $R^{a1}$ is, among them, preferably alkyl groups (in particular, a methyl group) and aryl groups (in particular, a phenyl group). The hydrocarbon group in the $R^{a1}$ may include a substituent (for example, such as a halogen atom, a hydroxy group, and a carboxy group).

In addition, examples of the siloxane including two or more alkenyl groups in the molecule include polyorganosilsesquioxanes represented by Formula (a') below (including a ladder type, a cage type, an incomplete cage type, and a random type represented by Formula (a'-1) below):

[Chem. 3]

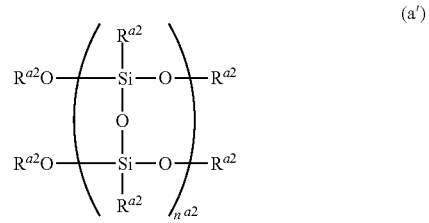

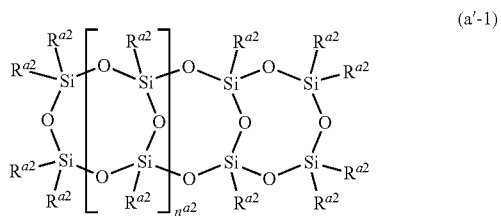

wherein $R^{a2}$ is the same or different and represents a hydrocarbon group that may include a substituent, with the proviso that at least two of $R^{a2}$ are alkenyl and that $n^{a2}$ represents an integer of 1 or greater.

Examples of the alkenyl group and the hydrocarbon group other than the alkenyl group in the $R^{a2}$ include the same examples as those for the alkenyl group and the hydrocarbon group other than the alkenyl group in the above $R^{a1}$ The $R^{a2}$ is, among them, preferably alkyl groups (in particular, a methyl group) and aryl groups (in particular, a phenyl group).

A viscosity (at 23° C.) of the silicone resin (A) is, for example, greater than 3700 mPa·s and less than 75000 mPa·s, preferably from 4000 to 50000 mPa·s, and particularly preferably from 5000 to 15000 mPa·s. Here, a method for measuring the viscosity is not particularly limited but is measured, for example, by a B-type viscometer. The resin composition containing the silicone resin (A) having a viscosity within the above range densely includes a crosslinked three-dimensional network structure, thereby tending to provide a cured product having high heat resistance, elongation at break reduced to a small level, and excellent shape stability.

In an embodiment of the present invention, as the silicone resin (A), for example, the trade names, such as "X-32-3094-2" and "X-32-3095" (the above available from Shin-Etsu Chemical Co., Ltd.), can be suitably used.

Curing Agent (B)

The curing agent (B) in an embodiment of the present invention is preferably a siloxane including two or more hydrosilyl groups (Si—H) in the molecule. The curing agent (B) is a component that causes a hydrosilylation reaction with the silicone resin (A) (such as a siloxane including an alkenyl group). One type of the curing agent (B) alone or two or more types thereof in combination can be used.

Siloxanes including two or more hydrosilyl groups (Si—H) in the molecule include linear, branched, or cyclic polyorganosiloxanes.

The linear or branched polyorganosiloxane including two or more alkenyl groups in the molecule is represented, for example, by Formula (b) below:

[Chem. 4]

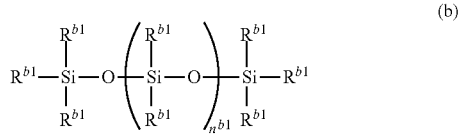
(b)

wherein $R^{b1}$ is the same or different and represents a hydrogen atom, a hydrocarbon group that may include a substituent; or a $[-OSi(R^{b1})_3]$ group ($R^{b1}$ is the same as above), with the proviso that at least two of $R^{b1}$ are hydrogen atoms and that $n^{b1}$ represents an integer of 1 or greater.

The hydrocarbon group that may include a substituent in the $R^{b1}$ is not particularly limited but examples thereof include the above monovalent substituted or unsubstituted hydrocarbon groups, more particularly, such as alkyl groups, aryl groups, aralkyl groups, and halogenated hydrocarbon groups. Among them, alkyl groups (in particular, a methyl group) and aryl groups (in particular, a phenyl group) are preferred.

In addition, the siloxane including two or more hydrosilyl groups in the molecule include polyorganosilsesquioxanes represented by Formula (b') below (including a ladder type, a cage type, an incomplete cage type, and a random type represented by Formula (b'-1) below):

[Chem. 5]

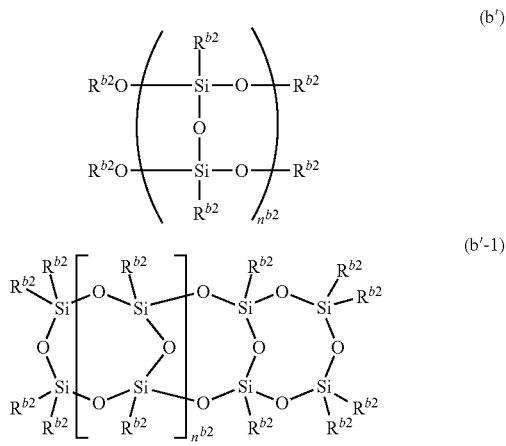

wherein $R^{b2}$ is the same or different and represents a hydrogen atom or a hydrocarbon group that may include a substituent, with the proviso that at least two of $R^{b2}$ are hydrogen atoms and that $n^{b2}$ represents an integer of 1 or greater.

The hydrocarbon group that may include a substituent in the $R^{b2}$ includes the same examples as those for the hydrocarbon group that may include a substituent in the above $R^{b1}$. Among them, alkyl groups (in particular, a methyl group) and aryl groups (in particular, a phenyl group) are preferred.

In an embodiment of the present invention, as the curing agent (B), for example, the trade names, such as "CX-32-3094-2" and "CAT-RG" (the above available from Shin-Etsu Chemical Co., Ltd.), can be suitably used.

The curing agent (B) is used in an amount, for example, from 1 to 20 parts by weight and preferably from 5 to 15 parts by weight relative to 100 parts by weight of the silicone resin (A).

Hydrosilylation Catalyst (C)

The hydrosilylation catalyst (C) in an embodiment of the present invention is a compound having a function of allowing a hydrosilylation reaction between the silicone resin (A) and the curing agent (B) in the resin composition to proceed more efficiently, and one type alone or two or more types thereof in combination can be used.

Examples of the hydrosilylation catalyst (C) include well-known hydrosilylation catalysts, such as platinum-based catalysts, rhodium-based catalysts, and palladium-based catalysts. Specifically, examples thereof include platinum-based catalysts, such as platinum fine powder; platinum black; platinum-carrying silica fine powder; platinum-carrying activated carbon; chloroplatinic acid; complexes of chloroplatinic acid and an alcohol, an aldehyde, a ketone, or the like; platinum-olefin complexes; platinum-carbonyl complexes (such as a platinum-carbonylvinylmethyl complex); platinum-vinylmethylsiloxane complexes (such as a platinum-divinyltetramethyldisiloxane complex and a platinum-cyclovinylmethylsiloxane complex); a platinum-phosphine complex; and a platinum-phosphite complex, and examples thereof also include palladium-based catalysts or rhodium-based catalysts which contain a palladium atom or a rhodium atom in place of the platinum atom in the above platinum-based catalysts. The hydrosilylation catalyst is, among them, preferably a platinum-based catalyst (for example, a platinum-vinylmethylsiloxane complex, a platinum-carbonylvinylmethyl complex, and a complex of chloroplatinic acid and an alcohol or an aldehyde).

The hydrosilylation catalyst (C) is used in an amount preferably from $1\times10^{-8}$ to $1\times10^{-2}$ mol and more preferably from $1.0\times10^{-6}$ to $1.0\times10^{-3}$ mol, per 1 mol of an alkenyl group contained in the silicone resin (A). The hydrosilylation catalyst (C) used in an amount of $1\times10^{-8}$ mol or greater tends to form a cured product more efficiently. On the other hand, the hydrosilylation catalyst (C) used in an amount of $1\times10^{-2}$ mol or less tends to provide a cured product having superior hue (with less coloration).

Additional Component

The resin composition in an embodiment of the present invention may contain one type or two or more types of additional components in addition to those described above, and examples thereof include siloxane compounds other than the silicone resin (A) and the curing agent (B), silane coupling agents, hydrosilylation reaction inhibitors, solvents, and various additives. Examples of the additives include inorganic fillers, solvents, stabilizers (such as antioxidants, ultraviolet absorbers, light-resistant stabilizers, and heat stabilizers), flame retardants (such as phosphorus-based flame retardants, halogen-based flame retardants, and inorganic flame retardants), flame retardant aids, reinforcing materials (such as other fillers), nucleating agents, coupling agents, lubricants, waxes, plasticizers, release agents, impact resistance modifiers, hue modifiers, fluidity improvers, colorants (such as dyes and pigments), dispersants, anti-foaming agents, defoaming agents, antibacterial agents, preservatives, viscosity modifiers, thickening agents, and phosphors.

The resin composition in an embodiment of the present invention can be produced by mixing the silicone resin (A), the curing agent (B), and the hydrosilylation catalyst (C); and as necessary the additional component. In an embodiment of the present invention, the above components may be mixed to produce the resin composition in advance, or the above components may be mixed to produce the resin composition upon curing. That is, the resin composition in an embodiment of the present invention may be a one-part type or may be a multi-part type (for example, a two-part type including an A agent containing the silicone resin (A); and a B agent containing the curing agent (B) and the hydrosilylation catalyst (C)).

The resin composition in an embodiment of the present invention includes the above components, thus it can rapidly form a high density cross-linked structure by heat treatment (for example, heat treatment in the conditions described later) and can form a cured product having moderate elasticity and excellent heat resistance.

Silicone Mold and Method for Manufacturing Same

The silicone mold according to an embodiment of the present invention includes a cured product of the resin composition. In addition, the cured product preferably includes on the surface thereof a reversed concavo-convex shape of the desired lens (an inverted shape of the desired optical element), particularly preferably includes a plurality of inverted concavo-convex shapes of the optical element (including, for example, 10 or more, preferably 20 or more, particularly preferably 30 or more, and most preferably 50 or more inverted concavo-convex shapes, with the upper limit of the number of the inverted concavo-convex shapes being, for example, 5000 and preferably 2000). Here, the inverted concavo-convex shape of the optical element may be disposed on the surface of the cured product without particular limit. Still further, the silicone mold according to an embodiment of the present invention may have a two-part configuration of an upper mold and a lower mold depending on the desired optical element. For example, in the case where the silicone mold according to an embodiment of the present invention is a mold for molding a lens, a mold having an inverted shape of the concave surface of the lens and a mold having an inverted shape of the convex surface of the lens can be provided to form a two-part configuration with one being the upper mold and the other being the lower mold.

In addition, the silicone mold according to an embodiment of the present invention is preferably used in a layered state on a substrate.

The silicone mold according to an embodiment of the present invention can be produced by molding (preferably imprint molding) the resin composition and then heat-curing the resin composition. A mold (=a mother mold) including a concavo-convex shape of the desired optical element can be used for molding the resin composition, and examples of the molding include the methods (1) and (2) below:

(1) A method of coating the resin composition to a substrate, pressing a mother mold thereon, curing the resin composition, and then detaching the mother mold;

(2) A method of coating the resin composition to a mother mold, pressing a substrate from above, curing the resin composition, and then detaching the mother mold.

A substrate having a light transmittance at a wavelength of 400 nm of 90% or higher is preferably used as the substrate, and a substrate made of quartz or glass can be suitably used. Here, the light transmittance at the wavelength is determined using a substrate (thickness: 1 mm) as a test piece and using a spectrophotometer to measure the light transmittance at the wavelength with which the test piece is irradiated.

The thickness of the substrate is, for example, from approximately 50 μm to 5 mm.

Coating methods, such as a spray method, a spin coating method, and a screen printing method, can be used to coat the resin composition. After the resin composition is coated, a solvent, if contained, is preferably removed by evaporation.

The resin composition can form a cured product by heat treatment. The heat treatment conditions are, for example, at room temperature to 150° C. for approximately from 0.5 to 6 hours. For the heat treatment, for example, an oven or the like can be used.

The cured product obtained by the above method has excellent transparency with a light transmittance at a wavelength of 400 nm in a cured product having a thickness of 1 mm being 80% or higher, preferably 85% or higher, particularly preferably 90% or higher, and most preferably 93% or higher.

In addition, the cured product has moderate elasticity with an elongation at break (in accordance with JIS K 7161) being 250% or less, preferably 220% or less, particularly preferably 200% or less, most preferably 150% or less, and most preferably 100% or less. The lower limit of the elongation at break is, for example, 50% and preferably 60%. Thus, the silicone mold including the cured product, even if used repeatedly, can prevent the occurrence of thermal expansion, crack, and the like.

Furthermore, the cured product has excellent heat resistance with a thermal linear expansion coefficient at 20 to 40° C. being 350 ppm/° C. or less, preferably 300 ppm/° C. or less, and particularly preferably 290 ppm/° C. or less. The lower limit of the thermal linear expansion coefficient is, for example, 150 ppm/° C., preferably 200 ppm/° C., particularly preferably 250 ppm/° C., and most preferably 260 ppm/° C. Thus, a silicone mold including the cured product, even if used for molding a curable composition containing an epoxy resin that cures with an exothermic reaction, can prevent thermal expansion of the silicone mold and can maintain high molding precision.

Still further, the cured product has moderate hardness with a durometer hardness at 23° C. (or a measured hardness value; Shore A) being, for example, from 60 to 85, preferably from 65 to 80, particularly preferably from 70 to 80, and most preferably from 75 to 80. Durometer hardness can be measured using a type A durometer in a manner in accordance with JIS K 6253 (2006).

A maximum thickness of the silicone mold (a maximum value of the part including the cured product) is, for example, 5 mm or less, preferably from 0.1 to 3 mm, and particularly preferably from 0.5 to 1 mm.

The silicone mold may include a release agent coated to the surface thereof. That is, the silicone mold according to an embodiment of the present invention may include at least one release layer on the surface of the cured product of the resin composition.

Examples of the release agent include fluorine-based release agents, silicone-based release agents, and wax-based release agents. One type alone or two or more types thereof in combination can be used.

Coating methods, such as a spray method, a spin coating method, and a screen printing method, can be used to coat the release agent.

According to an embodiment of the present invention, as described above, a silicone mold having excellent transparency and shape stability can be formed inexpensively. In addition, the silicone mold, if used, can significantly reduce the production cost of the optical element, enabling inexpensive production of an optical element with good precision.

Method for Producing Optical Element

The optical element according to an embodiment of the present invention includes a cured product of a curable composition (preferably a photocurable composition) containing an epoxy resin. The optical element can be produced by molding a curable composition containing an epoxy resin (preferably a photocurable composition) using the silicone mold and then photocuring the composition.

Curable Composition

The curable composition in an embodiment of the present invention contains at least an epoxy resin as a curable compound (preferably a cationic curable compound). Well known or commonly used compounds including one or more epoxy groups (oxirane rings) in the molecule can be used as the epoxy compound, and examples thereof include alicyclic epoxy resins, aromatic epoxy compounds, and aliphatic epoxy compounds. In an embodiment of the present invention, a polyfunctional alicyclic epoxy compound including an alicyclic structure and two or more epoxy groups as functional groups per molecule is preferred particularly in terms of being able to form a cured product having excellent heat resistance and transparency.

Examples of the polyfunctional alicyclic epoxy compounds specifically include:

a compound (i) including an epoxy group (an alicyclic epoxy group) constituted of two adjacent carbon atoms and an oxygen atom that constitute an alicyclic ring;

a compound (ii) including an epoxy group directly bonded to an alicyclic ring with a single bond; and a compound (iii) including an alicyclic ring and a glycidyl group.

Examples of the above compound (i) including an alicyclic epoxy group include a compound represented by Formula (i) below.

[Chem. 6]

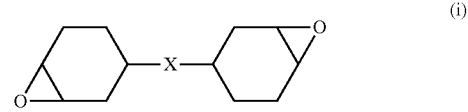

In Formula (i) above, X represents a single bond or a linking group (a divalent group including one or more atoms). Examples of the linking group include a divalent hydrocarbon group, an alkenylene group in which some or all of the carbon-carbon double bond or bonds are epoxidized, a carbonyl group, an ether bond, an ester bond, a carbonate group, an amide group, and a group in which a plurality thereof are linked. Here, a substituent, such as an alkyl group, may be bonded to one or more of the carbon atoms constituting a cyclohexane ring (a cyclohexene oxide group) in Formula (i).

Examples of the divalent hydrocarbon group include a linear or branched alkylene group having from 1 to 18 carbons and a divalent alicyclic hydrocarbon group. Examples of the linear or branched alkylene group having from 1 to 18 carbons include a methylene group, a methyl methylene group, a dimethyl methylene group, an ethylene group, a propylene group, and a trimethylene group. Examples of the divalent alicyclic hydrocarbon group include a cycloalkylene group (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in the alkenylene group in which some or all of the carbon-carbon double bond or bonds are epoxidized (which may be referred to as an "epoxidized alkenylene group") include a linear or branched alkenylene group having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an alkenylene group in which all of the carbon-carbon double bond or bonds are epoxidized and more preferably an alkenylene group having from 2 to 4 carbons in which all of the carbon-carbon double bond or bonds are epoxidized.

The linking group in the above X is particularly preferably a linking group containing an oxygen atom, and specifically, examples thereof include —CO—, —O—CO—O—, —COO—, —O—, —CONH—, and an epoxidized alkenylene group; a group in which a plurality of the groups thereof are linked; and a group in which one or two or more of the groups thereof and one or more of the divalent hydrocarbon groups are linked.

Representative examples of the compound represented by Formula (i) above include (3,4,3',4'-diepoxy)bicyclohexyl, bis(3,4-epoxycyclohexylmethyl)ether, 1,2-epoxy-1,2-bis(3,4-epoxycyclohexane-1-yl)ethane, 2,2-bis(3,4-epoxycyclohexane-1-yl)propane, 1,2-bis(3,4-epoxycyclohexane-1-yl)ethane, and compounds represented by Formulas (i-1) to (i-10) below. L in Formula (i-5) below is an alkylene group having from 1 to 8 carbons and, among them, preferably a linear or branched alkylene group having from 1 to 3 carbons, such as a methylene group, an ethylene group, a propylene group, or an isopropylene group. In Formulas (i-5), (i-7), (i-9), and (i-10) below, $n^1$ to $n^8$ each represent an integer from 1 to 30.

[Chem. 7]

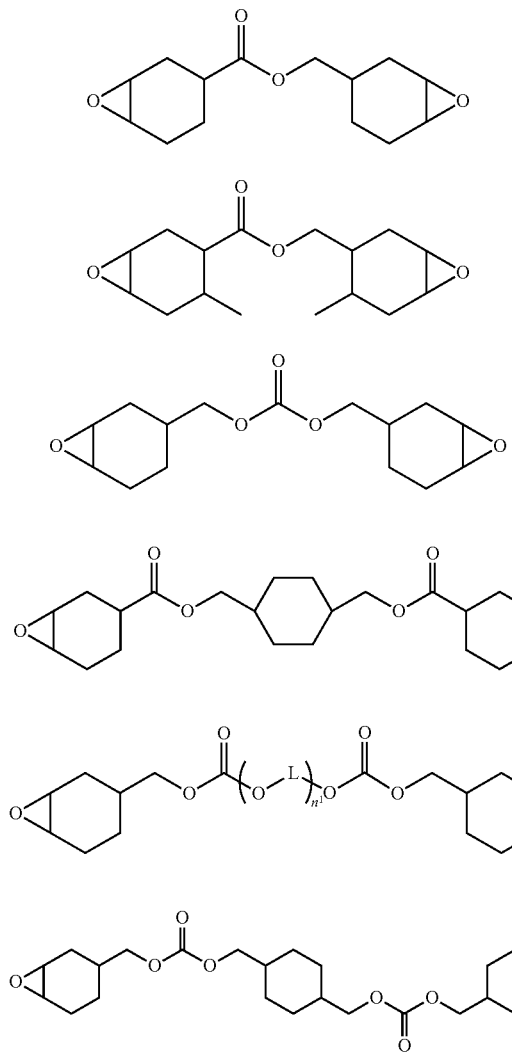

[Chem. 8]

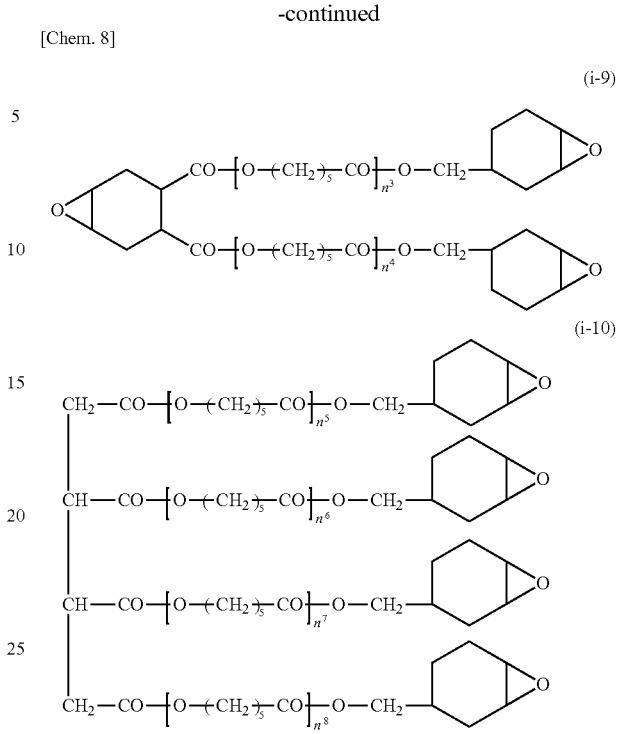

The above compound (i) including an alicyclic epoxy group also includes an epoxy-modified siloxane.

Examples of the epoxy-modified siloxane include a chain or cyclic polyorganosiloxane including a constituent unit represented by Formula (i') below.

[Chem. 9]

In Formula (i') above, $R^1$ represents a substituent containing an epoxy group represented by Formula (1a) or (1b) below, and $R^2$ represents an alkyl group or an alkoxy group.

[Chem. 10]

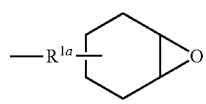

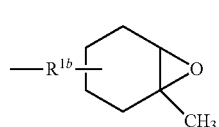

In the formulas, $R^{1a}$ and $R^{1b}$ are the same or different and represent a linear or branched alkylene group, and examples thereof include a linear or branched alkylene group having from 1 to 10 carbons, such as a methylene group, a methyl methylene group, a dimethyl methylene group, an ethylene group, a propylene group, a trimethylene group, a tetramethylene group, a pentamethylene group, a hexamethylene group, and a decamethylene group.

An epoxy equivalent (in accordance with JIS K7236) of the epoxy-modified siloxane is, for example, from 100 to 400 and preferably from 150 to 300.

Commercially available product, for example, such as an epoxy-modified cyclic polyorganosiloxane represented by Formula (i'-1) below (trade name "X-40-2670", available from Shin-Etsu Chemical Co., Ltd.), can be used as the epoxy-modified siloxane.

[Chem. 11]

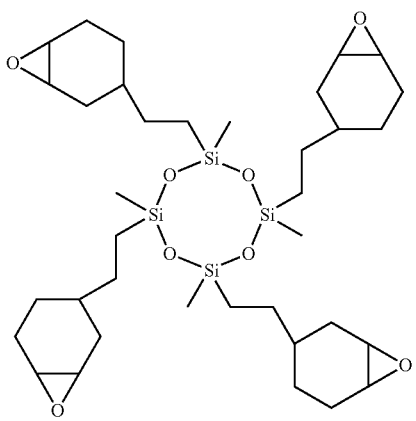

(i'-1)

Examples of the above compound (ii) including an epoxy group directly bonded to an alicyclic ring with a single bond include a compound represented by Formula (ii) below.

[Chem. 12]

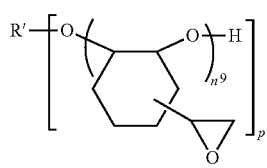

(ii)

In Formula (ii), R' is a group resulting from elimination of p hydroxyl groups (—OH) from a structural formula of a p-hydric alcohol (p-valent organic group), wherein p and $n^9$ each represent a natural number. Examples of the p-hydric alcohol [R'—(OH)$_p$] include polyhydric alcohols (alcohols having from 1 to 15 carbons), such as 2,2-bis(hydroxymethyl)-1-butanol. Here, p is preferably from 1 to 6, and $n^9$ is preferably from 1 to 30. When p is 2 or greater, $n^9$ in each group in square brackets (the outer brackets) may be the same or different. Examples of the compound represented by Formula (ii) above specifically include 1,2-epoxy-4-(2-oxiranyl)cyclohexane adduct of 2,2-bis(hydroxymethyl)-1-butanol (for example, such as the trade name "EHPE3150" (available from Daicel Corporation)).

Examples of the above compound (iii) including an alicyclic ring and a glycidyl group include a compound obtained by hydrogenating a bisphenol A type epoxy compound (a hydrogenated bisphenol A type epoxy compound); a compound obtained by hydrogenating a bisphenol F type epoxy compound (a hydrogenated bisphenol F type epoxy compound); a hydrogenated bisphenol type epoxy compound; a hydrogenated phenol novolac type epoxy compound; a hydrogenated cresol novolac type epoxy compound; a hydrogenated cresol novolac type epoxy compound of bisphenol A; a hydrogenated naphthalene type epoxy compound; and a hydrogenated aromatic glycidyl ether-based epoxy compound, such as a hydrogenated epoxy compound of an epoxy compound obtained from trisphenolmethane.

The polyfunctional alicyclic epoxy compound is preferably a compound (i) including an alicyclic epoxy group and particularly preferably a compound represented by Formula (i) above (in particular, (3,4,3',4'-diepoxy)bicyclohexyl), in terms of obtaining a cured product having high surface hardness and excellent transparency.

The curable composition in an embodiment of the present invention may contain additional curable compound in addition to the epoxy resin as the curable compound and can contain, for example, a cationic curable compound, such as an oxetane compound and a vinyl ether compound.

A proportion of the epoxy resin in a total amount (100 wt. %) of the curable compound contained in the curable composition is, for example, 50 wt. % or greater, preferably 60 wt. % or greater, particularly preferably 70 wt. % or greater, and most preferably 80 wt. % or greater. The upper limit is, for example, 100 wt. % and preferably 90 wt. %.

In addition, a proportion of the compound (i) including an alicyclic epoxy group in the total amount (100 wt. %) of the curable compound contained in the curable composition is, for example, 20 wt. % or greater, preferably 30 wt. % or greater, and particularly preferably 40 wt. % or greater. The upper limit is, for example, 70 wt. % and preferably 60 wt. %.

A proportion of the compound represented by Formula (i) in the total amount (100 wt. %) of the curable compound contained in the curable composition is, for example, 10 wt. % or greater, preferably 15 wt. % or greater, and particularly preferably 20 wt. % or greater, The upper limit is, for example, 50 wt. % and preferably 40 wt. %.

The curable composition preferably contains a photopolymerization initiator along with the curable compound and particularly preferably contains a photocationic polymerization initiator. The photocationic polymerization initiator is a compound that generates an acid by being irradiated with light and initiates a curing reaction of a curable compound (particularly a cationic curable compound) contained in a curable composition. The photocationic polymerization initiator includes a cationic part that absorbs light and an anionic part that is a source of an acid.

Examples of the photocationic polymerization initiator include a diazonium salt compound, an iodonium salt compound, a sulfonium salt compound, a phosphonium salt compound, a selenium salt compound, an oxonium salt compound, an ammonium salt compound, and a bromine salt compound.

In an embodiment of the present invention, among them, a sulfonium salt compound is preferably used in terms of being able to form a cured product having excellent curability. Examples of the cationic part of the sulfonium salt compound include an arylsulfonium ion (in particular, a triarylsulfonium ion), such as a (4-hydroxyphenyl)methylbenzylsulfonium ion, a triphenylsulfonium ion, a diphenyl[4-(phenylthio)phenyl]sulfonium ion, a 4-(4-biphenylylthio)phenyl-4-biphenylylphenylsulfonium ion, and a tri-p-tolylsulfonium ion.

Examples of the anionic part of the photocationic polymerization initiator include [(Y)$_s$B(Phf)$_{4-s}$]$^-$, wherein Y represents a phenyl group or a biphenylyl group, Phf represents a phenyl group in which at least one hydrogen atom is replaced with at least one selected from a perfluoroalkyl group, a perfluoroalkoxy group, and a halogen atom, and s is an integer from 0 to 3; $BF_4^-$; $[(Rf)_tPF_{6-t}]^-$, wherein Rf represents an alkyl group in which 80% or more of the hydrogen atoms are replaced with fluorine atoms, and t represents an integer from 0 to 5; $AsF_6^-$; $SbF_6^-$; and $SbF_5OH^-$.

Commercially available products can be used as photocationic polymerization initiators in an embodiment of the present invention. Examples thereof include (4-hydroxyphenyl)methylbenzylsulfonium tetrakis(pentafluorophenyl)borate; 4-(4-biphenylylthio)phenyl-4-biphenylylphenylsulfonium tetrakis(pentafluorophenyl)borate; 4-(phenylthio)phenyldiphenylsulfonium phenyltris(pentafluorophenyl)borate; [4-(4-biphenylylthio)phenyl]-4-biphenylylphenylsulfonium phenyltris(pentafluorophenyl)borate; diphenyl[4-(phenylthio)phenyl]sulfonium tris(pentafluoroethyl)trifluorophosphate; diphenyl[4-(phenylthio)phenyl]sulfonium tetrakis(pentafluorophenyl)borate; diphenyl[4-(phenylthio)phenyl]sulfonium hexafluorophosphate; 4-(4-biphenylylthio)phenyl-4-biphenylylphenylsulfonium tris(pentafluoroethyl)trifluorophosphate; bis[4-(diphenylsulfonio)phenyl] sulfide phenyltris(pentafluorophenyl)borate; [4-(2-thioxanthonylthio)phenyl]phenyl-2-thioxanthonylsulfonium phenyltris(pentafluorophenyl)borate; 4-(phenylthio)phenyldiphenylsulfonium hexafluoroantimonate; the trade names "Cyracure UVI-6970", "Cyracure UVI-6974", "Cyracure UVI-6990", and "Cyracure UVI-950" (the above available from Union Carbide Corporation, USA); "Irgacure250", "Irgacure261", and "Irgacure264" (the above available from BASF Corporation); "CG-24-61" (available from Ciba-Geigy Corporation); "Optomer SP-150", "Optomer SP-151", "Optomer SP-170", and "Optomer SP-171" (the above available from ADEKA Corporation); "DAICAT II" (available from Daicel Corporation); "UVAC1590" and "UVAC1591" (the above available from Daicel-Cytec Co., Ltd.); "CI-2064", "CI-2639", "CI-2624", "CI-2481", "CI-2734", "CI-2855", "CI-2823", "CI-2758", and "CIT-1682" (the above available from Nippon Soda Co., Ltd.); "PI-2074" (tetrakis(pentafluorophenyl)borate tolylcumyliodonium salt, available from Rhodia Japan Ltd.); "FFC509" (available from 3M Company); "BBI-102", "BBI-101", "BBI-103", "MPI-103", "TPS-103", "MDS-103", "DTS-103", "NAT-103", and "NDS-103" (the above available from Midori Kagaku Co., Ltd.); "CD-1010", "CD-1011", and "CD-1012" (the above available from Sartomer Co., Ltd., USA); and "CPI-100P" and "CPI-101A" (the above available from San-Apro Ltd.).

A content of the photopolymerization initiator is, for example, in a range of 0.1 to 5.0 parts by weight relative to 100 parts by weight of the curable compound (in particular, the cationic curable compound) contained in the curable composition. The content of the photopolymerization initiator in an amount less than the above range has a risk of causing curing failure. On the other hand, with the content of the photopolymerization initiator exceeding the above range, the cured product tends to be subject to coloration.

The curable composition in an embodiment of the present invention can be produced by mixing the curable compound, the photopolymerization initiator, and, as necessary, an additional component (for example, such as a solvent, an antioxidant, a surface conditioner, a photosensitizer, an anti-foaming agent, a leveling agent, a coupling agent, a surfactant, a flame retardant, an ultraviolet absorber, and a colorant). The additional component is blended in an amount of, for example, 20 wt. % or less, preferably 10 wt. % or less, and particularly preferably 5 wt. % or less of the total amount of the curable composition.

Curable compositions commercially available under the trade name, for example, such as, "CELVENUS OUH106" (available from Daicel Corporation) can also be used in an embodiment of the present invention.

Examples of the method for producing the optical element according to an embodiment of the present invention include a method of coating the curable composition to each of the upper mold and the lower mold of the silicone mold, laminating the upper mold and the lower mold coated with the curable composition with the coated surfaces facing each other, then curing the curable composition, and then detaching the upper mold and the lower mold to obtain an optical element.

The curable composition can be photocured by being irradiated with an active energy ray, such as ultraviolet light or electron beam. In an embodiment of the present invention, a silicone mold having excellent transparency is used, and thus this can allow a curing reaction to proceed rapidly by irradiation with an active energy ray to form an optical element having a high degree of curing. A light source used for irradiation with ultraviolet light include a high-pressure mercury lamp, an ultra-high-pressure mercury lamp, a carbon arc lamp, a xenon lamp, and a metal halide lamp. The irradiation time varies depending on the type of the light source, a distance between the light source and the coated surface, and other conditions but is several tens of seconds at the longest. The illuminance is approximately from 5 to 200 $mW/cm^2$. After the irradiation with the active energy ray, heating (post-curing) may be performed as necessary to facilitate curing.

The method for detaching the upper mold and the lower mold to obtain the optical element is not particularly limited, but examples of the method that can be employed include a method of first detaching the upper mold to expose the optical element surface, adhering an adhesive tape or the like to the exposed optical element surface, and detaching the lower mold in a fixed state.

A lens (for example, such as a microlens and a Fresnel lens) may be produced using a silicone mold including one inverted concavo-convex shape of the lens, but it is preferred to use a silicone mold including a plurality of inverted concavo-convex shapes of the lens to produce a molded product formed of a plurality of lenses connected via a joining section and then separate the resulting molded product by a method, such as dicing, to produce the lens in terms of enabling efficient mass-production of the lens.

Examples of the optical element obtained by the method for producing an optical element according to an embodiment of the present invention include a lens (for example, such as a microlens and a Fresnel lens) or a molded product formed of a plurality of the lenses (for example, 10 or more, preferably 20 or more, particularly preferably 30 or more, and most preferably 50 or more, with the upper limit being, for example, 5000 and preferably 2000) connected via a joining section (especially a molded product formed of the plurality of the lenses aligned in the longitudinal and transverse directions and connected via a joining section, i.e. an arrayed molded product), a prism sheet, and a lenticular lens sheet.

The optical element, when it is an arrayed molded article formed of a plurality of lenses connected via a joining section for example, has a size of, for one lens, a diameter (or a maximum value of diameter) of approximately from 0.5 to 10 mm and a thickness (or a maximum value of thickness) of approximately from 0.1 to 2.0 mm. In addition, a width of the joining section (i.e. a pitch width) is from approximately 0.5 to 20 mm.

According to the method for producing an optical element in an embodiment of the present invention, the silicone mold having excellent shape stability is used, and thus a high-precision optical element can be stably produced even if the silicone mold is used repeatedly.

EXAMPLES

Hereinafter, the present invention will be described more specifically with reference to examples, but the present invention is not limited by these examples.

Examples 1 and 2

Comparative Examples 1 to 4

Resin compositions were obtained according to formulations (units: parts by weight) described in the table below. The resulting cured products of the resin compositions were evaluated for transmittance, elongation at break, linear expansion coefficient, and distance from the center, by the following method.

Light Transmittance

A spacer made of Teflon (registered trademark), 40 mm in length×20 mm in width×1.0 mm in thickness was produced and sandwiched between glass slides (trade name "S2111", available from Matsunami Glass Ind., Ltd.), the slides mold release treated in advance (dipped into the trade name "OPTOOL HD1000", available from Daikin Industries, Ltd., and allowed to stand in a fume hood for 24 hours). The resin compositions obtained in Examples and Comparative Examples each were cast into the gap, then allowed to stand at room temperature for 2 hours, and then heated in an oven at 150° C. for 30 minutes to cure to obtain a cured product (thickness: 1.0 mm).

A light transmittance at a wavelength of 400 nm of the resulting cured product was measured using a spectrophotometer (trade name "U-3900", available from Hitachi High-Technologies Corporation).

Elongation at Break

A cured product (thickness: 1.0 mm) was prepared by the same procedure as the sample for measuring transmittance.

The resulting cured product was taken out in the form of a No. 7 dumbbell and tested using a universal material testing machine (trade name "Tensilon RTG-1310", available from A&D Company, Limited) in accordance with JIS K 7161 (1994) at a tensile speed of 100 mm/min and a gauge length of 10 mm. A value when the maximum stress was detected was reported as elongation at break.

Thermal Linear Expansion Coefficient

A cured product (thickness: 1 mm) was prepared by the same procedure as the sample for measuring transmittance.

A linear expansion coefficient of the resulting cured product was measured using an TMA measuring device (trade name "TMA/SS100", available from SIT Nano Technology Inc.). An expansion coefficient was measured in the conditions of a heating rate of 5° C./min in a measurement temperature range from 30 to 100° C. to express a linear slope from 20° C. to 40° C. as a linear expansion coefficient (ppm/° C.).

Durometer Hardness

A cured product (thickness: 10 mm) was prepared by the same procedure as the sample for measuring transmittance.

A durometer hardness of the resulting cured product was measured at 23° C. using a type A durometer by a method in accordance with JIS K 6253 (2006) (Rubber, Vulcanized or Thermoplastic-Determination of Hardness).

Position Precision Evaluation

Silicone molds were produced using the resin compositions obtained in Examples and Comparative Examples.

A curable composition (trade name "CELVENUS OUH106", containing a cationic curable compound and a photocationic polymerization initiator, wherein 85 wt. % of a total amount of the cationic curable compound is an epoxy resin, and containing, as an epoxy resin, (3,4,3',4'-diepoxy)bicyclohexyl in 30 wt. % of the total amount of the cationic curable compound, available from Daicel Corporation) was coated to the silicone mold, and the mold was closed from above with a flat silicone mold (plane precision: within ±10 μm). After the mold was closed, the mold was irradiated with UV (80 mW×30 seconds), and then the mold was opened. After being allowed to stand for 5 minutes, the mold was detached to obtain a microlens array (n=10) as a molded product.

Using an image measurement system (trade name "NEXIV VMR-H3030", available from Nikon Corporation), a distance between the central point of the molded product and the central point of the lens shape was measured for four lens shapes located at or near the diameter 48 mm and four lens shapes located at or near the diameter 76 mm (see FIG. 1).

[The maximum value]–[the minimum value] of the measured values (40 data) for the lens shapes located at or near the diameter 48 mm and [the maximum value]–[the minimum value] of the measured values (40 data) for the lens shapes located at or near the diameter 76 mm were calculated to evaluate a position precision of the molded product.

TABLE 1

|  |  |  | Example 1 | Example 2 | Comparative Example 1 | Comparative Example 2 | Comparative Example 3 | Comparative Example 4 |
| --- | --- | --- | --- | --- | --- | --- | --- | --- |
| Silicone resin composition | Silicone resin | X-32-3094-2 | 100 |  |  |  |  |  |
|  |  | X-32-3095 |  | 100 |  |  |  |  |
|  |  | X-32-3212 |  |  | 100 |  |  |  |
|  |  | KE-1310ST |  |  |  | 100 |  |  |
|  |  | SILGARD184 |  |  |  |  | 100 |  |
|  |  | KE-1606 |  |  |  |  |  | 100 |
|  | Curing agent | CX-32-3094-2 | 10 |  |  |  |  |  |
|  |  | CX-32-3212 |  |  | 10 |  |  |  |
|  |  | CAT-1310L |  |  |  | 10 |  |  |
|  |  | SILGARD184 Curing agent |  |  |  |  | 10 |  |
|  |  | CAT-RG |  |  |  |  |  | 10 |

TABLE 1-continued

| | | Example 1 | Example 2 | Comparative Example 1 | Comparative Example 2 | Comparative Example 3 | Comparative Example 4 |
|---|---|---|---|---|---|---|---|
| Evaluations of cured product and molded product | Light transmittance (%) | 93.7 | 94.1 | 93.7 | 79.8 | 93.6 | 92.5 |
| | Elongation at break (%) | 83 | 103 | 233 | 538 | 206 | 428 |
| | Thermal linear expansion coefficient (ppm/° C.) | 283 | 272 | 364 | 544 | 516 | 593 |
| | Durometer hardness | 79 | 76 | 59 | 40 | 43 | 28 |
| | Distance from center (mm) [max]-[min]  ϕ48 mm | 0.011 | 0.009 | 0.016 | 0.027 | 0.024 | 0.025 |
| | ϕ76 mm | 0.025 | 0.020 | 0.029 | 0.036 | 0.035 | 0.037 |

Silicone Resins
X-32-3094-2: vinyl group-containing polyorganosiloxane, viscosity (at 23° C.) of 18800 mPa·s, available from Shin-Etsu Chemical Co., Ltd.
X-32-3095: containing a vinyl group-containing polyorganosiloxane and a hydrosilyl group-containing polyorganosiloxane (vinyl group-containing polyorganosiloxane/hydrosilyl group-containing polyorganosiloxane (weight ratio) = 1/10), and a hydrosilylation catalyst, viscosity (at 23° C.) of 5500 mPa·s, available from Shin-Etsu Chemical Co., Ltd.
X-32-3212: vinyl group-containing polyorganosiloxane, viscosity (at 23° C.) of 3700 mPa·s, available from Shin-Etsu Chemical Co., Ltd.
KE-1310ST: vinyl group-containing polyorganosiloxane, viscosity (at 23° C.) of 75000 mPa·s, available from Shin-Etsu Chemical Co., Ltd.
SYLGARD184: vinyl group-containing polyorganosiloxane, viscosity (at 23° C.) of 3500 mPa·s, available from Dow Corning Toray Co., Ltd.
KE-1606: vinyl group-containing polyorganosiloxane, viscosity (at 23° C.) of 3500 mPa·s, available from Shin-Etsu Chemical Co., Ltd.
Curing Agents
CX-32-3094-2: containing a hydrosilyl group-containing polyorganosiloxane and a hydrosilylation catalyst, available from Shin-Etsu Chemical Co., Ltd.
CX-32-3212: containing a hydrosilyl group-containing polyorganosiloxane and a hydrosilylation catalyst, available from Shin-Etsu Chemical Co., Ltd.
CAT-1310L: containing a hydrosilyl group-containing polyorganosiloxane and a hydrosilylation catalyst, available from Shin-Etsu Chemical Co., Ltd.
SYLGARD184 Curing agent: containing a hydrosilyl group-containing polyorganosiloxane and a hydrosilylation catalyst, available from Dow Corning Toray Co., Ltd.
CAT-RG: containing a hydrosilyl group-containing polyorganosiloxane and a hydrosilylation catalyst, available from Shin-Etsu Chemical Co., Ltd.

INDUSTRIAL APPLICABILITY

The silicone mold according to an embodiment of the present invention includes the above configuration, thus it has excellent shape stability and can reduce an effect due to heat generated by the curing reaction of the epoxy resin, i.e. the expansion caused by heat generated by the curing reaction of the epoxy resin, to a very low level. In addition, the silicone mold has moderate hardness and thus can prevent degradation due to repeated use. Thus, the silicone mold according to an embodiment of the present invention can reduce the decrease in molding precision due to repeated use to a very low level, compared to molds known in the art, and the silicone mold according to an embodiment of the present invention, if used, can stably produce a high-precision optical element from the curable composition containing the epoxy resin.

To summarize the above, configurations according to embodiments of the present invention and variations thereof will be described below.

(1) A silicone mold for use in molding a curable composition containing an epoxy resin, the silicone mold including a cured product of a silicone resin composition, wherein the cured product has a light transmittance at a wavelength of 400 nm of 80% or higher at a thickness of 1 mm, an elongation at break in accordance with JIS K 7161 of 250% or less, and a thermal linear expansion coefficient of 350 ppm/° C. or less at 20 to 40° C.

(2) The silicone mold according to (1), wherein the silicone resin composition is an addition reaction type silicone resin composition.

(3) The silicone mold according to (1) or (2), wherein the silicone resin composition includes a silicone resin, a curing agent, and a hydrosilylation catalyst.

(4) The silicone mold according to any one of (1) to (3), wherein the silicone resin is a siloxane including two or more alkenyl groups in the molecule.

(5) The silicone mold according to any one of (1) to (4), wherein the silicone resin is represented by Formula (a) above. ($R^{a1}$ is the same or different and represents a hydrocarbon group that may include a substituent; or a [—OSi($R^{a1}$)$_3$] group ($R^{a1}$ is the same as above), with the proviso that at least two of $R^{a1}$s are alkenyl group and that $n^{a1}$ is an integer of 1 or greater.)

(6) The silicone mold according to any one of (1) to (5), wherein a viscosity (at 23° C.) of the silicone resin is more than 3700 mPa·s and less than 75000 mPa·s, preferably from 4000 to 50000 mPa·s, and particularly preferably from 5000 to 15000 mPa·s.

(7) The silicone mold according to any one of (3) to (6), wherein the curing agent is a siloxane including two or more hydrosilyl groups (Si—H) in the molecule.

(8) The silicone mold according to any one of (3) to (7), wherein the curing agent is represented by Formula (b) above. ($R^{b1}$ is the same or different and represents a hydrogen atom, a hydrocarbon group that may include a substituent; or a [—OSi($R^{b1}$)$_3$] group ($R^{b1}$ is the same as above), with the proviso that at least two of $R^{b1}$s are hydrogen atoms and that $n^{b1}$ is an integer of 1 or greater.)

(9) The silicone mold according to any one of (3) to (8), wherein the curing agent is used in an amount, for example, from 1 to 20 parts by weight and preferably from 5 to 15 parts by weight relative to 100 parts by weight of the silicone resin.

(10) The silicone mold according to any one of (3) to (9), wherein the hydrosilylation catalyst is at least one hydrosilylation reaction catalyst selected from the group consisting of a platinum-based catalyst, a rhodium-based catalyst, and a palladium-based catalyst.

(11) The silicone mold according to any one of (3) to (10), wherein the hydrosilylation catalyst is a platinum-based catalyst (for example, a platinum-vinylmethylsiloxane complex, a platinum-carbonylvinylmethyl complex, and a complex of chloroplatinic acid and an alcohol or an aldehyde).

(12) The silicone mold according to any one of (3) to (11), wherein the hydrosilylation catalyst is used in an amount from $1×10^{-8}$ to $1×10^{-2}$ mol and preferably from $1.0×10^{-6}$ to $1.0×10^{-3}$ mol, per 1 mol of an alkenyl group contained in the silicone resin.

(13) The silicone mold according to any one of (1) to (12), wherein the cured product has a light transmittance at a wavelength of 400 nm of 85% or higher, preferably 90% or higher, and particularly preferably 93% or higher at a thickness of 1 mm.

(14) The silicone mold according to any one of (1) to (13), wherein the cured product has an elongation at break in accordance with JIS K 7161 of 220% or less, more preferably 200% or less, particularly preferably 150% or less, and particularly preferably 100% or less, with the lower limit of the elongation at break being 50% and preferably 60%.

(15) The silicone mold according to any one of (1) to (14), wherein the cured product has a thermal linear expansion coefficient at 20 to 40° C. of 300 ppm/° C. or less and more preferably 290 ppm/° C. or less, with the lower limit of the thermal linear expansion coefficient being, for example, 150 ppm/° C., preferably 200 ppm/° C., particularly preferably 250 ppm/° C., and most preferably 260 ppm/° C.

(16) The silicone mold according to any one of (1) to (15), wherein the cured product has a durometer hardness at 23° C. (or a measured hardness value; Shore A) from 60 to 85, preferably from 65 to 80, particularly preferably from 70 to 80, and most preferably from 75 to 80, wherein the durometer hardness is measured using a type A durometer in a manner in accordance with JIS K 6253 (2006).

(17) The silicone mold according to any one of (1) to (16), wherein a maximum thickness of the silicone mold (a maximum value of the part including the cured product) is 5 mm or less, preferably from 0.1 to 3 mm, and particularly preferably from 0.5 to 1 mm.

(18) A method for producing a silicone mold including molding a silicone resin composition, and subsequently heat-curing the silicone resin composition to form the silicone mold described in any one of (1) to (17).

(19) A method for producing an optical element including molding a curable composition containing an epoxy resin using the silicone mold described in any one of (1) to (17) and subsequently subjecting the curable composition to photocuring to form an optical element including a cured product of the curable composition.

(20) The method for producing an optical element according to (19), wherein the epoxy resin is at least one selected from the group consisting of an alicyclic epoxy compound, an aromatic epoxy compound, and an aliphatic epoxy compound.

(21) The method for producing an optical element according to any one of (19) or (20), wherein the epoxy resin is a polyfunctional alicyclic epoxy compound.

(22) The method for producing an optical element according to any one of (19) to (21), wherein the epoxy resin is at least one selected from the group consisting of (i), (ii), and (iii) below:
a compound (i) including an epoxy group (an alicyclic epoxy group) constituted of two adjacent carbon atoms and an oxygen atom that constitute an alicyclic ring;
a compound (ii) including an epoxy group directly bonded to an alicyclic ring with a single bond; and
a compound (iii) including an alicyclic ring and a glycidyl group.

(23) The method for producing an optical element according to any one of (19) to (22), wherein the epoxy resin is a compound represented by Formula (i) above, wherein X represents a single bond or a linking group (a divalent group including one or more atoms); examples of the linking group include a divalent hydrocarbon group, an alkenylene group in which some or all of the carbon-carbon double bond or bonds are epoxidized, a carbonyl group, an ether bond, an ester bond, a carbonate group, an amide group, and a group in which a plurality thereof are linked; and a substituent, such as an alkyl group, may be bonded to one or more of the carbon atoms constituting a cyclohexane ring (a cyclohexene oxide group) in the formula.

(24) The method for producing an optical element according to any one of (19) to (23), wherein a diameter of the optical element (or a maximum value of diameter) is from 0.5 to 10 mm.

(25) The method for producing an optical element according to any one of (19) to (24), wherein a maximum thickness of the optical element is from 0.1 to 2.0 mm.

(26) The method for producing an optical element according to any one of (19) to (25), wherein the optical element is a microlens, a Fresnel lens, a molded product formed of a plurality of microlenses or Fresnel lenses bonded via a joining section, a lenticular lens sheet, or a prism sheet.

The invention claimed is:

1. A silicone mold for use in molding a curable composition containing an epoxy resin, the silicone mold comprising a cured product of a silicone resin composition, wherein the cured product has a light transmittance at a wavelength of 400 nm of 80% or higher at a thickness of 1 mm, an elongation at break in accordance with JIS K 7161 of 250% or less, a thermal linear expansion coefficient of 350 ppm/° C. or less at 20 to 40° C., and viscosity (at 23° C.) of the silicone resin is from 5000 mPa·s to less than 75000 mPa·s.

2. The silicone mold according to claim 1, wherein the silicone resin composition is an addition reaction type silicone resin composition.

3. The silicone mold according to claim 1, wherein a maximum thickness of the silicone mold is 5 mm or less.

4. A method for producing a silicone mold comprising molding a silicone resin composition, and subsequently heat-curing the silicone resin composition to form the silicone mold described in claim 1.

5. A method for producing an optical element comprising molding a curable composition containing an epoxy resin using the silicone mold described in claim 1, and subsequently subjecting the curable composition to photocuring to form an optical element including a cured product of the curable composition.

6. The method for producing an optical element according to claim 5, wherein the epoxy resin is a polyfunctional alicyclic epoxy compound.

7. The method for producing an optical element according to claim 5, wherein the epoxy resin is a compound represented by Formula (i) below:

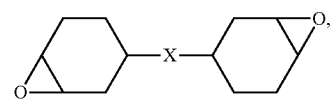

wherein X represents a single bond or a linking group.

8. The method for producing an optical element according to claim 5, wherein a maximum thickness of the optical element is from 0.1 to 2.0 mm.

9. The method for producing an optical element according to claim 5, wherein the optical element is a microlens, a Fresnel lens, a molded product formed of a plurality of microlenses or Fresnel lenses bonded via a joining section, a lenticular lens sheet, or a prism sheet.

10. The silicone mold according to claim 2, wherein a maximum thickness of the silicone mold is 5 mm or less.

11. A method for producing a silicone mold comprising molding a silicone resin composition, and subsequently heat-curing the silicone resin composition to form the silicone mold described in claim 2.

12. A method for producing a silicone mold comprising molding a silicone resin composition, and subsequently heat-curing the silicone resin composition to form the silicone mold described in claim 3.

13. A method for producing an optical element comprising molding a curable composition containing an epoxy resin using the silicone mold described in claim 2, and subsequently subjecting the curable composition to photocuring to form an optical element including a cured product of the curable composition.

14. A method for producing an optical element comprising molding a curable composition containing an epoxy resin using the silicone mold described in claim 3, and subsequently subjecting the curable composition to photocuring to form an optical element including a cured product of the curable composition.

15. The method for producing an optical element according to claim 6, wherein a maximum thickness of the optical element is from 0.1 to 2.0 mm.

16. The method for producing an optical element according to claim 7, wherein a maximum thickness of the optical element is from 0.1 to 2.0 mm.

17. The method for producing an optical element according to claim 6, wherein the optical element is a microlens, a Fresnel lens, a molded product formed of a plurality of microlenses or Fresnel lenses bonded via a joining section, a lenticular lens sheet, or a prism sheet.

18. The method for producing an optical element according to claim 7, wherein the optical element is a microlens, a Fresnel lens, a molded product formed of a plurality of microlenses or Fresnel lenses bonded via a joining section, a lenticular lens sheet, or a prism sheet.

19. The method for producing an optical element according to claim 8, wherein the optical element is a microlens, a Fresnel lens, a molded product formed of a plurality of microlenses or Fresnel lenses bonded via a joining section, a lenticular lens sheet, or a prism sheet.

* * * * *